(12) United States Patent
Ying et al.

(10) Patent No.: US 10,873,253 B2
(45) Date of Patent: Dec. 22, 2020

(54) DISCHARGE CONTROL METHOD FOR BUS CAPACITOR IN POWER CONVERTER

(71) Applicant: Delta Electronics (Shanghai) Co.,Ltd., Shanghai (CN)

(72) Inventors: Jianping Ying, Shanghai (CN); Hailong Wang, Shanghai (CN); Peng Xiao, Shanghai (CN); Lifeng Qiao, Shanghai (CN); Hongwei Xiao, Shanghai (CN); Boyu Pu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/730,755

(22) Filed: Oct. 12, 2017

(65) Prior Publication Data

US 2018/0152097 A1    May 31, 2018

(30) Foreign Application Priority Data

Nov. 29, 2016  (CN) .......................... 2016 1 1071275

(51) Int. Cl.
*H02M 7/487* (2007.01)
*H02M 1/32* (2007.01)
(Continued)

(52) U.S. Cl.
CPC ............ *H02M 1/32* (2013.01); *H02M 7/487* (2013.01); *H02M 7/53871* (2013.01); *H02J 7/345* (2013.01); *H02M 2001/322* (2013.01)

(58) Field of Classification Search
CPC .......... H02M 7/487; H02M 1/32; H02M 1/36; H02M 7/217; H02M 7/219; H02M 7/42;
(Continued)

(56) References Cited

U.S. PATENT DOCUMENTS

2013/0148391 A1* 6/2013 Grbovic ................. H02M 1/32
                                                     363/56.01
2013/0301325 A1* 11/2013 Jakob .................... H02M 7/487
                                                     363/131
(Continued)

FOREIGN PATENT DOCUMENTS

| CN | 1750374 A | 3/2006 |
| CN | 101728821 A | 6/2010 |
| CN | 103269155 A | 8/2013 |
| CN | 103738197 A | 4/2014 |
| CN | 104702090 A | 6/2015 |

(Continued)

OTHER PUBLICATIONS

English translation CN103269155. (Year: 2013).*

*Primary Examiner* — Thienvu V Tran
*Assistant Examiner* — Carlos O Rivera-Perez
(74) *Attorney, Agent, or Firm* — CKC & Partners Co., LLC

(57) ABSTRACT

The present disclosure discloses a method of discharging a bus capacitor in a power converter, the method comprising: outputting a plurality of pulse control signals to the corresponding plurality of power semiconductor switch groups when the working state of the power converter is in a discharge state and the state of the main circuit breaker is open to control the ON and OFF of the plurality of power semiconductor switch groups, respectively, so as to form a discharge loop between the positive terminal and the negative terminal of the bus capacitor within at least a preset time, thereby causing the bus capacitor to discharge. Since a discharge loop is formed by the bus capacitor and the bridge arms and the energy of the bus capacitor is consumed by a power device, thereby the peak value and discharge rate of discharge current can be effectively controlled without adding additional discharge elements.

13 Claims, 9 Drawing Sheets

(51) Int. Cl.
*H02M 7/5387* (2007.01)
*H02J 7/34* (2006.01)

(58) Field of Classification Search
CPC .......... H02M 7/44; H02M 7/48; H02M 7/483;
H02M 7/49; H02M 7/493; H02M 7/497;
H02M 7/501; H02M 7/515; H02M 7/521;
H02M 7/525; H02M 7/527; H02M 7/537;
H02M 7/538; H02M 7/53871; H02M
7/53875; H02M 7/53888; H02M 7/539;
H02M 7/5395; H02M 2001/322; H02M
2007/4835; H02M 2007/53878; H02J
7/34; H02J 7/345
USPC .... 343/16–21.01, 32, 35, 37, 40–43, 50, 55,
343/56.01, 59, 60, 62, 74, 95–98, 106,
343/109, 123, 131–134; 323/266,
323/271–276, 282–288, 351; 320/118,
320/122, 124, 129, 131, 135, 166, 167
See application file for complete search history.

(56) References Cited

U.S. PATENT DOCUMENTS

2015/0214828 A1* 7/2015 Zhang .................... H02M 1/08
363/123
2018/0079315 A1* 3/2018 Yang .................... B60L 3/0046

FOREIGN PATENT DOCUMENTS

CN 105765814 A 7/2016
CN 107846155 A 3/2018

\* cited by examiner

21 — judging the working state of the power converter and the state of the main circuit breaker of the power converter by a controller, and outputting a plurality of pulse control signals to the corresponding plurality of power semiconductor switch groups when the working state of the power converter is in a discharge state and the state of the main circuit breaker is open.

22 — controlling the ON and OFF of the plurality of power semiconductor switch groups respectively by the plurality of pulse control signals, so as to form a discharge loop between the positive terminal and the negative terminal of the bus capacitor within at least a preset time, thereby causing the bus capacitor to discharge, wherein, during one duty cycle, the pulse width of the pulse control signal for controlling the power semiconductor switch group of the first bridge arm has a first overlapping time; the pulse width of the pulse control signal for controlling the power semiconductor switch group of the second bridge arm has a second overlapping time; the pulse width of the pulse control signal for controlling the power semiconductor switch group of the third bridge arm has a third overlapping time; a phase difference among the first overlapping time, the second overlapping time and the third overlapping time is 120°, and during the first overlapping time, the power semiconductor switch group of the first bridge arm is in an On state, and the bus capacitor and the power semiconductor switch group of the first bridge arm form a discharge loop; during the second overlapping time, the power semiconductor switch group of the second bridge arm is in an On state, and the bus capacitor and the power semiconductor switch group of the second bridge arm form a discharge loop; and during the third overlapping time, the power semiconductor switch group of the third bridge arm is in an On state, and the bus capacitor and the power semiconductor switch group of the third bridge arm form a discharge loop.

Fig.15

DISCHARGE CONTROL METHOD FOR BUS CAPACITOR IN POWER CONVERTER

CROSS-REFERENCE TO RELATED APPLICATIONS

This non-provisional application claims priority under 35 U.S.C. § 119(a) on Patent Application No. 201611071275.X filed in P.R. China on Nov. 29, 2016, the entire contents of which are hereby incorporated by reference.

Some references, if any, which may include patents, patent applications and various publications, may be cited and discussed in the description of this disclosure. The citation and/or discussion of such references, if any, is provided merely to clarify the description of the present disclosure and is not an admission that any such reference is "prior art" to the disclosure described herein. All references listed, cited and/or discussed in this specification are incorporated herein by reference in their entireties and to the same extent as if each reference was individually incorporated by reference.

TECHNICAL FIELD

The present disclosure relates to a discharge control method for a bus capacitor, and particularly to a discharge control method for a bus capacitor in a power converter.

BACKGROUND ART

With the development of modern industry, medium-voltage high power converter systems are widely used in industrial fields of production such as ferrous metallurgy, petrochemical engineering and rail transit, etc.

Some problems in the applications of medium-voltage high power converter systems have been found: in the case of normal shutdown or breakdown of a power converter system, there is a need to quickly discharge bus voltage of up to more than a dozen kV to ensure the safety of the related personnel or to prevent the expansion of breakdown of the power converter system. In a conventional solution for discharge of a DC bus capacitor, a high-voltage relay is connected in series to a discharge resistor and then connected in parallel to the two terminals of a DC bus capacitor, and when the DC bus capacitor needs to discharge, the high-voltage relay is controlled to be switched on so that the DC bus capacitor discharges through the discharge resistor. In the above solution, the corresponding highly withstand voltage relay needs to be selected, and the corresponding safety isolation and insulation should also be carried out on the low-voltage control terminals of the relay, thereby increasing the cost and complexity of the power converter system. In the above solution, as regards the selection of discharge resistor, it is also difficult to balance the power loss of the discharge resistor with the discharge time thereof. When the resistance value of the discharge resistor is too small, it is required that their power consumption is large enough; when the resistance value of the discharge resistor is too large, the discharge time is too long, thereby increasing the waiting time for debugging and repairing the power converter system. When the power converter system is broken down, the breakdown of the power converter system may also be expanded.

At present, methods of discharge of a DC bus capacitor substantially fall into the following two categories:

DC discharge mode: a switch element is connected in series to a discharge element and then connected in parallel to the two terminals of a DC bus capacitor, and the switch element is turned off during normal operation; when a converter system shuts down or breaks down, the switch element is turned on to release the electric energy in the DC bus capacitor. As to selection of the switch element, it is necessary to take into consideration the withstand voltage and the safety insulation of the low-voltage control terminal of the switch element. As to selection of discharge element, it is necessary to take into consideration the power loss and discharge time of the discharge element, etc. This mode requires extra switch element with high withstand voltage and extra discharge element with higher power loss, thereby increasing the cost, size and complexity of the power converter system.

(2) AC discharge mode: In this mode, the electric energy of the DC bus capacitor is transferred to the AC output end of an inverter by modulating a power device on the inverter, and electricity is discharged through the corresponding load. According to the load type, this mode can be divided into the following categories: resistive load discharge, inductive load discharge, capacitive load discharge and their combination. In the AC discharge mode, no additional AC load is needed, and electric energy is always consumed through the LC filter circuit (an inductive DCR and a capacitive ESR) of the topology of the power converter system. The discharge capacity of this mode is limited and the discharge time is long.

In order to overcome the above-mentioned deficiencies, it is urgent to develop a novel discharge control method for a bus capacitor in a power converter.

DISCLOSURE OF THE INVENTION

In order to overcome the above-mentioned problems existing in the prior art, it is an object of the present disclosure to provide a discharge control method for a bus capacitor in a power converter, the power converter includes a bridge arm and a bus capacitor connected in parallel, and the bridge arm includes a plurality of power semiconductor switch groups, the discharge control method is characterized in comprising the following steps:

step 11: judging the working state of the power converter and the state of the main circuit breaker of the power converter by a controller, and outputting a plurality of pulse control signals to the corresponding plurality of power semiconductor switch groups when the working state of the power converter is in a discharge state and the state of the main circuit breaker is open; and step 12: controlling the ON and OFF of the plurality of power semiconductor switch groups respectively by the plurality of pulse control signals, so as to form a discharge loop between the positive terminal and the negative terminal of the bus capacitor within at least a preset time, thereby causing the bus capacitor to discharge.

As regards the above discharge control method for a bus capacitor in a power converter, the pulse widths of the plurality of pulse control signals fully or partially overlap with an overlapping time, and the overlapping time is the preset time.

As regards the above discharge control method for a bus capacitor in a power converter, the preset time is an adjustable value.

As regards the above discharge control method for a bus capacitor in a power converter, the bridge arm includes a first power semiconductor switch group and a second power semiconductor switch group, and the first power semiconductor switch group and the second power semiconductor switch group are connected in series and then are connected in parallel to the positive terminal and the negative terminal of the bus capacitor, respectively; the plurality of pulse control signals include a first pulse control signal and a second pulse control signal for controlling the ON and OFF of the first power semiconductor switch group and the second power semiconductor switch group, respectively, so as to form the discharge loop among the positive terminal of the bus capacitor, the first power semiconductor switch group, the second power semiconductor switch group, and the negative terminal of the bus capacitor during the preset time.

As regards the above discharge control method for a bus capacitor in a power converter, the pulse width of the first pulse control signal and the pulse width of the second pulse control signal fully or partially overlap with an overlapping time, and the overlapping time is the preset time.

As regards the above discharge control method for a bus capacitor in a power converter, wherein the bridge arm includes a first power semiconductor switch group, a second power semiconductor switch group, a third power semiconductor switch group and a fourth power semiconductor switch group, and the bus capacitor includes a first bus capacitor and a second bus capacitor which are connected in series, the first power semiconductor switch group, the second power semiconductor switch group, the third power semiconductor switch and the fourth power semiconductor switch group are connected in series and then are connected in parallel to the positive terminal of the first bus capacitor and the negative terminal of the second bus capacitor; the power converter further comprises a fifth switch group and a sixth switch group, one end of the fifth switch group being connected to the connection point of the first bus capacitor and the second bus capacitor, the other end of the fifth switch group being connected to the connection point of the first power semiconductor switch group and the second power semiconductor switch group, one end of the sixth switch group being connected to the connection point of the first bus capacitor and the second bus capacitor, and the other end of the sixth switch group being connected to the connection point of the third power semiconductor switch group and the fourth power semiconductor switch group.

As regards the above discharge control method for a bus capacitor in a power converter, the plurality of pulse control signals include a first pulse control signal, a second pulse control signal, a third pulse control signal and a fourth pulse control signal for controlling the ON and OFF of the first power semiconductor switch group, the second power semiconductor switch group, the third power semiconductor switch group and the fourth power semiconductor switch group, respectively, so as to form the discharge loop among the first bus capacitor, the first power semiconductor switch group, the second power semiconductor switch group, the third power semiconductor switch group, the fourth power semiconductor switch group and the second bus capacitor during the preset time.

As regards the above discharge control method for a bus capacitor in a power converter, the pulse width of the first pulse control signal, the pulse width of the second pulse control signal, the pulse width of the third pulse control signal and the pulse width of the fourth pulse control signal fully or partially overlap with an overlapping time, and the overlapping time is the preset time.

As regards the above discharge control method for a bus capacitor in a power converter, the first pulse control signal and the second pulse control signal are the same, and the third pulse control signal and the fourth pulse control signal are the same.

As regards the above discharge control method for a bus capacitor in a power converter, the at least one preset time includes a first preset time and a second preset time; the plurality of pulse control signals include a first pulse control signal, a second pulse control signal, a third pulse control signal and a fourth pulse control signal for controlling the ON and OFF of the first power semiconductor switch group, the second power semiconductor switch group, the third power semiconductor switch group and the fourth power semiconductor switch group, respectively, so as to form the discharge loop among the first bus capacitor, the first power semiconductor switch group, the second power semiconductor switch group, the third power semiconductor switch group and the sixth switch group during the first preset time, and to form the discharge loop among the fifth switch group, the second power semiconductor switch group, the third power semiconductor switch group, the fourth power semiconductor switch group and the second bus capacitor during the second preset time.

As regards the above discharge control method for a bus capacitor in a power converter, the first preset time and the second preset time are the same or different.

As regards the above discharge control method for a bus capacitor in a power converter, the pulse width of the first pulse control signal, the pulse width of the second pulse control signal and the pulse width of the third pulse control signal partially overlap with an overlapping time, and the overlapping time is the first preset time; and the pulse width of the second pulse control signal, the pulse width of the third pulse control signal and the pulse width of the fourth pulse control signal partially overlap with an overlapping time, and the overlapping time is the second preset time.

As regards the above discharge control method for a bus capacitor in a power converter, the second pulse control signal and the third pulse control signal are the same.

As regards the above discharge control method for a bus capacitor in a power converter, the bridge arm includes a first power semiconductor switch group, a second power semiconductor switch group, a third power semiconductor switch group and a fourth power semiconductor switch group, the bus capacitor includes a first bus capacitor and a second bus capacitor which are connected in series, and the first power semiconductor switch group, the second power semiconductor switch group, the third power semiconductor switch and the fourth power semiconductor switch group are connected in series and then are connected in parallel to the positive terminal of the first bus capacitor and the negative terminal of the second bus capacitor; the power converter further comprises a fifth power semiconductor switch group and a sixth power semiconductor switch group, the fifth power semiconductor switch group and the sixth power semiconductor switch group forming a series branch, one end of the series branch being connected to the connection point of the first bus capacitor and the second bus capacitor, and the other end of the series branch being connected to the connection point of the second power semiconductor switch group and the third power semiconductor switch group.

As regards the above discharge control method for a bus capacitor in a power converter, the plurality of pulse control signals include a first pulse control signal, a second pulse control signal, a third pulse control signal and a fourth pulse control signal for controlling the ON and OFF of the first power semiconductor switch group, the second power semi-conductor switch group, the third power semiconductor switch group and the fourth power semiconductor switch group, respectively, so as to form the discharge loop among the first bus capacitor, the first power semiconductor switch group, the second power semiconductor switch group, the third power semiconductor switch group, the fourth power semiconductor switch group and the second bus capacitor during the preset time.

As regards the above discharge control method for a bus capacitor in a power converter, the pulse width of the first pulse control signal, the pulse width of the second pulse control signal, the pulse width of the third pulse control signal and the pulse width of the fourth pulse control signal fully or partially overlap with an overlapping time, and the overlapping time is the preset time.

As regards the above discharge control method for a bus capacitor in a power converter, the at least one preset time includes a first preset time and a second preset time; the plurality of pulse control signals include a first pulse control signal, a second pulse control signal, a third pulse control signal, a fourth pulse control signal, a fifth pulse control signal and a sixth pulse control signal for controlling the ON and OFF of the first power semiconductor switch group, the second power semiconductor switch group, the third power semiconductor switch group, the fourth power semiconductor switch group, the fifth power semiconductor switch group and the sixth power semiconductor switch group, respectively, so as to form the discharge loop among the first bus capacitor, the first power semiconductor switch group, the second power semiconductor switch group, the fifth power semiconductor switch group and the sixth power semiconductor switch group during the first preset time, and to form the discharge loop among the second bus capacitor, the fifth power semiconductor switch group, the sixth power semiconductor switch group, the third power semiconductor switch group and the fourth power semiconductor switch group during the second preset time.

As regards the above discharge control method for a bus capacitor in a power converter, the first preset time and the second preset time are the same or different.

As regards the above discharge control method for a bus capacitor in a power converter, the pulse width of the first pulse control signal, the pulse width of the second pulse control signal and the pulse width of the sixth pulse control signal fully or partially overlap with an overlapping time, and the overlapping time is the first preset time; and the pulse width of the third pulse control signal, the pulse width of the fourth pulse control signal and the pulse width of the fifth pulse control signal fully or partially overlap with an overlapping time, and the overlapping time is the second preset time.

As regards the above discharge control method for a bus capacitor in a power converter, the first pulse control signal and the second pulse control signal are the same, and the third pulse control signal and the fourth pulse control signal are the same.

As regards the above discharge control method for a bus capacitor in a power converter, the bridge arm includes a first power semiconductor switch group, a second power semiconductor switch group, a third power semiconductor switch group and a fourth power semiconductor switch group, the bus capacitor includes a first bus capacitor and a second bus capacitor which are connected in series, and the first power semiconductor switch group, the second power semiconductor switch group, the third power semiconductor switch and the fourth power semiconductor switch group are connected in series and then are connected in parallel to the positive terminal of the first bus capacitor and the negative terminal of the second bus capacitor; the power converter further comprises a first capacitor group, one end of the first capacitor group being connected to the connection point of the first power semiconductor switch group and the second power semiconductor switch group, and the other end of the first capacitor group being connected to the connection point of the third power semiconductor switch group and the fourth power semiconductor switch group.

As regards the above discharge control method for a bus capacitor in a power converter, the at least one preset time includes a first preset time and a second preset time; the plurality of pulse control signals include a first pulse control signal, a second pulse control signal, a third pulse control signal and a fourth pulse control signal for controlling the ON and OFF of the first power semiconductor switch group, the second power semiconductor switch group, the third power semiconductor switch group and the fourth power semiconductor switch group, respectively, so as to form the discharge loop among the first capacitor group, the second power semiconductor switch group and the third power semiconductor switch group during the first preset time, and to form the discharge loop among the first bus capacitor, the first power semiconductor switch group, the first capacitor group, the fourth power semiconductor switch group and the second bus capacitor during the second preset time.

As regards the above discharge control method for a bus capacitor in a power converter, the pulse width of the second pulse control signal and the pulse width of the third pulse control signal fully or partially overlap with an overlapping time, and the overlapping time is the first preset time; and the pulse width of the first pulse control signal and the pulse width of the fourth pulse control signal fully or partially overlap with an overlapping time, and the overlapping time is the second preset time.

As regards the above discharge control method for a bus capacitor in a power converter, the first capacitor group includes a first capacitor and a second capacitor connected in series, the first power semiconductor switch group includes two first power semiconductor switches connected in series, the second power semiconductor switch group includes two second power semiconductor switches connected in series, the third power semiconductor switch group includes two third power semiconductor switches mutually connected in series, the fourth power semiconductor switch group includes two fourth power semiconductor switches connected in series, and a fifth power semiconductor switch group and a sixth power semiconductor switch group are further comprised, wherein the fifth power semiconductor switch group includes two fifth power semiconductor switches connected in series, and the sixth power semiconductor switch group includes two sixth power semiconductor switches connected in series, the fifth power semiconductor switch group being connected between the connection point of the first bus capacitor and the second bus capacitor and the connection point of the first capacitor and the second capacitor, and the sixth power semiconductor switch group being connected between the connection point of the first capacitor and the second capacitor and the connection point of the second power semiconductor switch group and the third power semiconductor switch group.

As regards the above discharge control method for a bus capacitor in a power converter, the at least one preset time includes a first preset time and a second preset time; when the bus voltage of the bus capacitor is high, the overlapping time is the first preset time; and when the bus voltage of the bus capacitor is low, the overlapping time is the second preset time, wherein the first preset time is less than the second preset time.

The present disclosure further provides a discharge control method for a bus capacitor in a power converter, the power converter including first, second and third bridge arms and a bus capacitor connected in parallel, and the first, second and third bridge arms each including a plurality of power semiconductor switch groups, the discharge control method is characterized in comprising the following steps:

step 21: judging the working state of the power converter and the state of the main circuit breaker of the power converter by a controller, and outputting a plurality of pulse control signals to the corresponding plurality of power semiconductor switch groups when the working state of the power converter is in a discharge state and the state of the main circuit breaker is open; and step 22: controlling the ON and OFF of the plurality of power semiconductor switch groups respectively by the plurality of pulse control signals, so as to form a discharge loop between the positive terminal and the negative terminal of the bus capacitor within at least a preset time, thereby causing the bus capacitor to discharge, wherein, during one duty cycle, the pulse width of the pulse control signal for controlling the power semiconductor switch group of the first bridge arm has a first overlapping time; the pulse width of the pulse control signal for controlling the power semiconductor switch group of the second bridge arm has a second overlapping time; the pulse width of the pulse control signal for controlling the power semiconductor switch group of the third bridge arm has a third overlapping time; a phase difference among the first overlapping time, the second overlapping time and the third overlapping time is 120°, and during the first overlapping time, the power semiconductor switch group of the first bridge arm is in an On state, and the bus capacitor and the power semiconductor switch group of the first bridge arm form a discharge loop; during the second overlapping time, the power semiconductor switch group of the second bridge arm is in an On state, and the bus capacitor and the power semiconductor switch group of the second bridge arm form a discharge loop; and during the third overlapping time, the power semiconductor switch group of the third bridge arm is in an On state, and the bus capacitor and the power semiconductor switch group of the third bridge arm form a discharge loop.

Compared with the prior art, the present disclosure has the following technical effects, all or part of which are beneficial:

A discharge loop is directly formed for a bus capacitor through the power semiconductor switches in the bridge arms, thereby forming a discharge loop by the bridge arms and the bus capacitor and consuming the electric energy of the bus capacitor in the power semiconductor switch devices. When the voltage on the bus capacitor is very high, the effective narrow pulses applied to the bridge arms cause the bus capacitor to be short-circuited so as to form a discharge loop, ensuring that the discharge current flowing through the power semiconductor switch devices is within the allowable range of current of repetitive peaks. In the present disclosure, a phase dislocation modulation method is used to control the power semiconductor switch devices in the bridge arms to obtain the desired narrow pulse control signal with an effective width, so as to effectively control the peak value and discharge rate of discharge current without adding additional discharge elements.

BRIEF DESCRIPTION OF THE DRAWINGS

FIG. 15 is a flow chart of a discharge control method for a bus capacitor in a power converter according to another example of the present disclosure.

EMBODIMENTS

The detail contents and technical description of the present disclosure will be further described with reference to a preferable example, which, however, should not be interpreted as limiting the implementation of the present disclosure.

Figure 1:
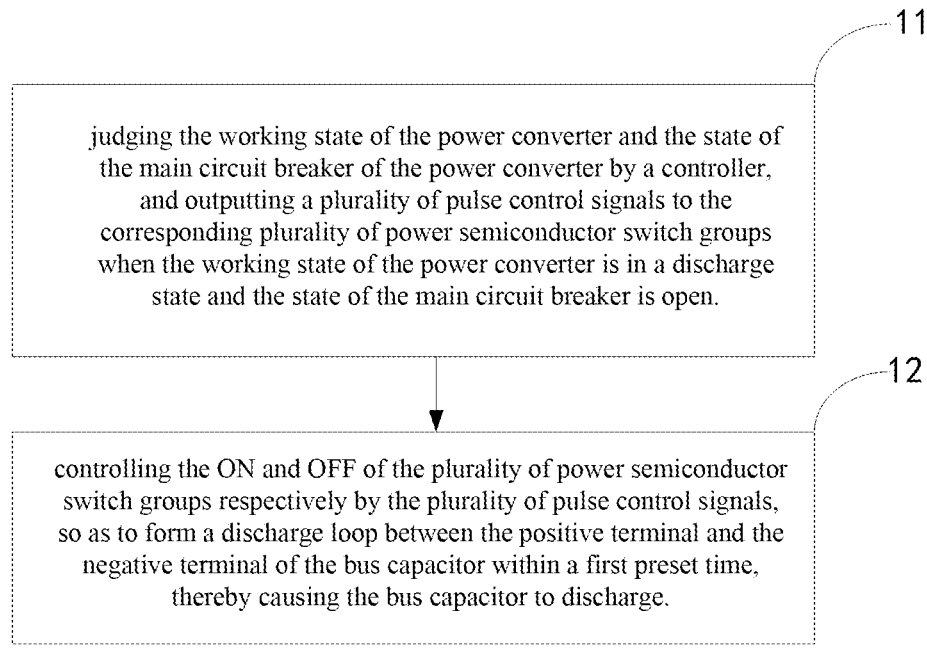
FIG. 1 is a flow chart of a discharge control method for a bus capacitor in a power converter according to an example of the present disclosure.

Please refer to FIG. 1, which is a flow chart of a discharge control method for a bus capacitor in a power converter according to the present disclosure. As shown in FIG. 1, as for the discharge control method for a bus capacitor in a power converter according to the present disclosure, the power converter includes a bridge arm and a bus capacitor connected in parallel, and the bridge arm includes a plurality of power semiconductor switch groups, wherein the discharge control method comprises the following steps:

step 11: judging the working state of the power converter and the state of the main circuit breaker of the power converter by a controller, and outputting a plurality of pulse control signals to the corresponding plurality of power semiconductor switch groups when the working state of the power converter is in a discharge state and the state of the main circuit breaker is open; and step 12: controlling the ON and OFF of the plurality of power semiconductor switch groups respectively by the plurality of pulse control signals, so as to form a discharge loop between the positive terminal and the negative terminal of the bus capacitor within at least a preset time, thereby causing the bus capacitor to discharge.

The pulse widths of the plurality of pulse control signals fully or partially overlap, the overlapping time is the preset time, and the preset time is an adjustable value, wherein the preset time determines the discharge rate of the bus capacitor, thus the corresponding preset time can be selected according to the discharge rate so that the discharge rate of the bus capacitor can be controlled, but the present disclosure is not limited thereto.

Figure 2:
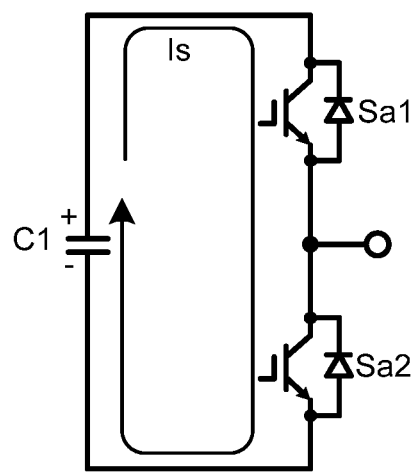
FIG. 2 is a schematic diagram of a discharge loop of a bus capacitor in a voltage source type two-level converter.
Figure 3:
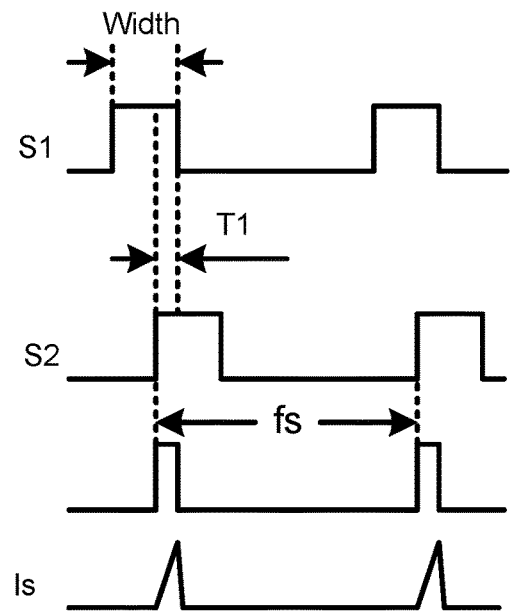
FIG. 3 is a waveform diagram of the pulse control signal and the discharge current in FIG. 2.

Please refer to FIGS. 2-3, of which FIG. 2 is a schematic diagram of a discharge loop of a bus capacitor in a voltage source type two-level converter, and FIG. 3 is a waveform diagram of the pulse control signal and the discharge current in FIG. 2. As shown in FIGS. 2-3, the voltage source type two-level converter comprises a bridge arm and a bus capacitor C1, the bridge arm includes a first power semiconductor switch group Sa1 and a second power semiconductor switch group Sa2, and the first power semiconductor switch group Sa1 and the second power semiconductor switch group Sa2 are connected in series and then are connected in parallel to the positive terminal (+) and the negative terminal (−) of the bus capacitor C1, respectively. In this embodiment, the first power semiconductor switch group Sa1 or the second power semiconductor switch group Sa2 may be a single power semiconductor switch or may be composed of a plurality of power semiconductor switches connected in series, wherein the power semiconductor switches may be IGBT, IGCT and Mosfet, etc. The first pulse control signal S1 and the second pulse control signal S2 control the ON and OFF of the first power semiconductor switch group Sa1 and the second power semiconductor switch group Sa2, respectively, so as to form the discharge loop among the positive terminal of the bus capacitor C1, the first power semiconductor switch group Sa1, the second power semiconductor switch group Sa2, and the negative terminal of the bus capacitor C1 during the preset time T1. In this embodiment, the pulse width of the first pulse control signal S1 and the pulse width of the second pulse control signal S2 partially overlap with an overlapping time, and the overlapping time is a preset time T1, that is, the first pulse control signal S1 and the second pulse control signal S2 are subjected to phase dislocation modulation, so that the first pulse control signal S1 and the second pulse control signal S2 partially overlap, the overlapping time is the preset time T1, and a narrow pulse with a magnitude of one hundred ns is generated during the overlapping time, wherein the pulse width of the narrow pulse can be flexibly adjusted as needed, and, during the preset time T1, the discharge current Is rises linearly and the electric energy in the bus capacitor C1 is consumed by the first power semiconductor switch group Sa1 and the second power semiconductor switch group Sa2; but the present disclosure is not limited thereto. In other examples, the pulse width of the first pulse control signal S1 and the pulse width of the second pulse control signal S2 may fully overlap, the overlapping time is the preset time T1, and a narrow pulse with a magnitude of one hundred ns is generated during the preset time T1, wherein during the preset time T1, the discharge current Is rises linearly and the electric energy in the bus capacitor C1 is consumed by the first power semiconductor switch group Sa1 and the second power semiconductor switch group Sa2.

It is worth noting that FIG. 2 only shows a schematic diagram of a discharge loop formed between a bus capacitor and a single-phase bridge arm in a voltage source type two-level converter. In a three-phase power source type two-level converter, three single-phase bridge arms are connected together in parallel, and the power semiconductor switches in each of the bridge arms are turned on successively, so that the bus capacitor C1 forms a discharge loop with the power semiconductor switch on each said bridge arm successively for discharging the bus capacitor, that is, when the first power semiconductor switch group Sa1 and the second power semiconductor switch group Sa2 of one bridge arm of the three-phase power source type two-level converter are in an ON state during a preset time T1, the bus capacitor C1, the first power semiconductor switch group Sa1 and the second power semiconductor switch group Sa2 form a discharge loop; then, the first power semiconductor switch group Sa1 and the second power semiconductor switch group Sa2 of another bridge arm are in an ON state during a preset time T1, the bus capacitor C1, the first power semiconductor switch group Sa1 and the second power semiconductor switch group Sa2 form a discharge loop; and then, the first power semiconductor switch group Sa1 and the second power semiconductor switch group Sa2 of the last bridge arm (different from the first two bridge arms) are in an ON state during a preset time T1, the bus capacitor C1, the first power semiconductor switch group Sa1 and the second power semiconductor switch group Sa2 form a discharge loop. The above-mentioned three bridge arms discharge in turn the electric energy in the bus capacitor C1; the phase difference among the first pulse control signals in the three bridge arms is 120°, and the phase difference among the second pulse control signals is 120°; and the pulse widths and frequencies of the first pulse control signals S1 of the three bridge arms are the same, so are the pulse widths and frequencies of the second pulse control signal S2. In this embodiment, both of the frequencies fs of the first pulse control signal S1 and the second pulse control signal S2 are 1 kHz, and both of the pulse widths Width of the first pulse control signal S1 and the second pulse control signal S2 are 3 µs, wherein the overlapping time T1 of the pulse widths of the first pulse control signal S1 and the second pulse control signal S2 is 100 ns, that is, the width of the effective narrow pulse control signal is 100 ns, the bus voltage is 10 kV, the bus capacitor C1 is 140 uF, the peak $Is_{peak}$ of the discharge current Is is 200 A, and the discharge time is about 30 s.

Figure 4:
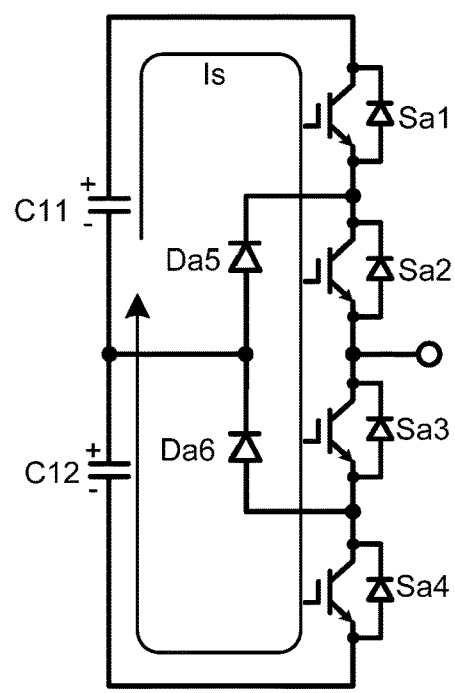
FIG. 4 is a schematic diagram of a discharge loop of a bus capacitor in a diode-clamped three-level converter.
Figure 5:
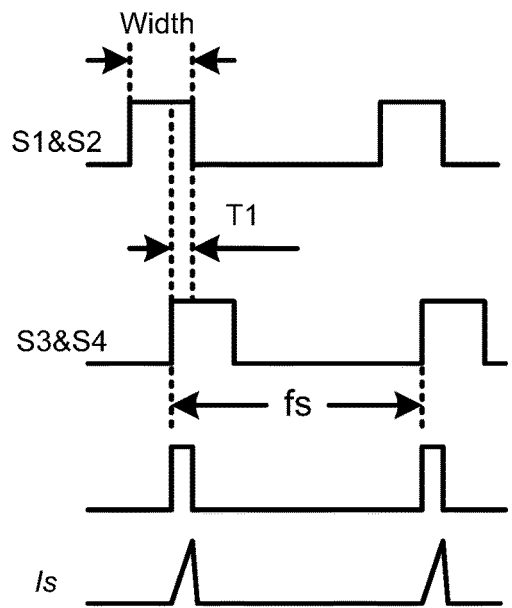
FIG. 5 is a waveform diagram of the pulse control signal and the discharge current in FIG. 4.

Please refer to FIGS. 4-5, of which FIG. 4 is a schematic diagram of a discharge loop of a bus capacitor in a diode-clamped three-level converter, and FIG. 5 is a waveform diagram of the pulse control signal and the discharge current in FIG. 4. As shown in FIGS. 4-5, the diode-clamped three-level converter comprises a first bus capacitor C11 and a second bus capacitor C12, a fifth switch group Da5 and a sixth switch group Da6 as well as a single-phase bridge arm, wherein the fifth switches Da5 and the sixth switches Da6 are also power semiconductor switches, such as power diodes. The first bus capacitor C11 and the second bus capacitor C12 are connected in series. The single-phase bridge arm includes a first power semiconductor switch group Sa1, a second power semiconductor switch group Sa2, a third power semiconductor switch group Sa3, and a fourth power semiconductor switch group Sa4. The first power semiconductor switch group Sa1, the second power semiconductor switch group Sa2, the third power semiconductor switch group Sa3, and the fourth power semiconductor switch group Sa4 are connected in series and then connected in parallel to the positive terminal of the first bus capacitor C11 and the negative terminal of the second bus capacitor C12. One end of the fifth switch group Da5 is connected to the connection point of the first bus capacitor C11 and the second bus capacitor C12, the other end of the fifth switch group Da5 is connected to the connection point of the first power semiconductor switch group Sa1 and the second power semiconductor switch group Sa2, one end of the sixth switch group Da6 is connected to the connection point of the first bus capacitor C11 and the second bus capacitor C12, and the other end of the sixth switch group Da6 is connected to the connection point of the third power semiconductor switch group Sa3 and the fourth power semiconductor switch group Sa4. The first pulse control signal S1, the second pulse control signal S2, the third pulse control signal S3, and the fourth pulse control signal S4 control the ON and OFF of the first power semiconductor switch group Sa1, the second power semiconductor switch group Sa2, the third power semiconductor switch group Sa3 and the fourth power semiconductor switch group Sa4, respectively, so as to form a discharge loop among the first bus capacitor C11, the first power semiconductor switch group Sa1, the second power semiconductor switch group Sa2, the third power semiconductor switch group Sa3, the fourth power semiconductor switch group Sa4 and the second bus capacitor C12 during the preset time T1.

Furthermore, the pulse widths of the first pulse control signal S1, the second pulse control signal S2, the third pulse control signal S3 and the fourth pulse control signal S4 partially overlap with an overlapping time, and the overlapping time is a preset time T1, wherein the first pulse control signal S1, the second pulse control signal S2, the third pulse control signal S3 and the fourth pulse control signal S4 are subjected to phase dislocation modulation, i.e., the first pulse control signal Sa1 and the second pulse control signal Sa2 are first turned on, the third pulse control signal Sa3 and the fourth pulse control signal Sa4 are turned on after the first pulse control signal Sa1 and the second pulse control signal Sa2, the first pulse control signal Sa1 and the second pulse control signal Sa2 are the same, and the third pulse control signal Sa3 and the fourth pulse control signal Sa4 are the same. The first pulse control signal Sa1 (or the second pulse control signal Sa2) and the third pulse control signal Sa3 (or the fourth pulse control signal Sa4) partially overlap with the overlapping time, and the overlapping time is a preset time T1; in other words, during the preset time T1, the first power semiconductor switch group Sa1, the second power semiconductor switch group Sa2, the third power semiconductor switch group Sa3, and the fourth power semiconductor switch group Sa4 are all in an ON state, so that the bus capacitors C1 and C2 form a discharge loop with the first power semiconductor switch group Sa1, the second power semiconductor switch group Sa2, the third power semiconductor switch group Sa3 and the fourth power semiconductor switch group Sa4, thereby consuming the electric energy of the bus capacitors C1 and C2 in the first power semiconductor switch group Sa1, the second power semiconductor switch group Sa2, the third power semiconductor switch group Sa3 and the fourth power semiconductor switch group Sa4. During the discharge of the bus capacitors, the discharge current Is rises linearly within the preset time T1, wherein the preset time T1 is the effective time for discharging the electric energy of the bus capacitors. Each of the first power semiconductor switch group Sa1, the second power semiconductor switch group Sa2, the third power semiconductor switch group Sa3, and the fourth power semiconductor switch group Sa4 bears half of the bus voltage. Since the respective drivers for driving the first power semiconductor switch group Sa1, the second power semiconductor switch group Sa2, the third power semiconductor switch group Sa3 and the fourth power semiconductor switch group Sa4 correspondingly are high discreteness, during phase dislocation modulation, the power semiconductor switch that is turned on last will risk overvoltage because it will bear the entire bus voltage applied thereto, thus it is necessary to configure an active clamp circuit for each power semiconductor switch. While the voltage borne by the two ends of a power semiconductor switch is rising rapidly, the active clamp circuit injects charges to the control electrode of the power semiconductor switch to speed up the turn-on of the power semiconductor switch, so that the power semiconductor switch operates in a linear amplification region and, accordingly, the voltage borne by the two ends of the power semiconductor switch is within a voltage range it can resist, thereby protecting the power semiconductor switch from broken-down caused by overvoltage. However, the present disclosure is not limited thereto, and in other embodiments, the pulse widths of the first pulse control signal S1, the second pulse control signal S2, the third pulse control signal S3 and the fourth pulse control signal S4 fully overlap. Note that the first pulse control signal S1 is the same as the second pulse control signal S2, and the third pulse control signal S3 is the same as the fourth pulse control signal S4.

Figure 6:
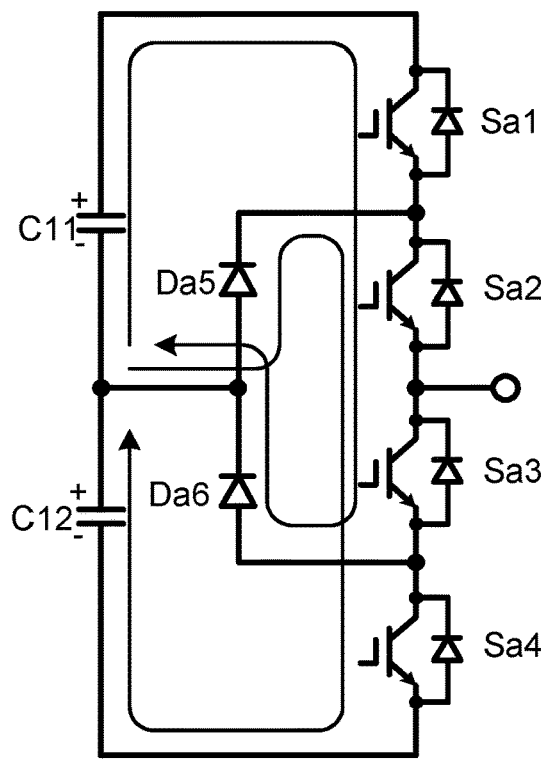
FIG. 6 is a schematic diagram of a discharge loop of a bus capacitor in another diode-clamped three-level converter.
Figure 7:
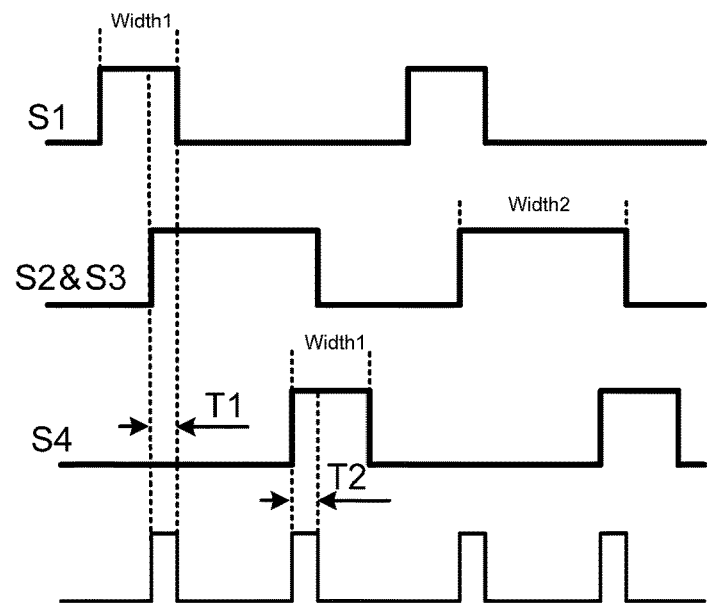
FIG. 7 is a waveform diagram of the pulse control signal in FIG. 6.

Please refer to FIGS. 6-7, of which FIG. 6 is a schematic diagram of a discharge loop of a bus capacitor in another diode-clamped three-level converter, and FIG. 7 is a waveform diagram of the pulse control signal in FIG. 6. The structure of the single-phase bridge arm of the diode-clamped three-level converter shown in FIGS. 6-7 is exactly the same as that shown in FIGS. 4-5, so details will not be repeated here, and the difference will be described below. The at least one period of preset time includes a first preset time T1 and a second preset time T2; the first pulse control signal S1, the second pulse control signal S2, the third pulse control signal S3 and the fourth pulse control signal S4 control the ON and OFF of the first power semiconductor switch group Sa1, the second power semiconductor switch group Sa2, the third power semiconductor switch group Sa3 and the fourth power semiconductor switch group Sa4, respectively, so as to form a discharge loop among the first capacitor C11, the first power semiconductor switch group Sa1, the second power semiconductor switch group Sa2, the third power semiconductor switch group Sa3 and the sixth switch group Da6 during the first preset time T1, and to form a discharge loop among the fifth switch group Da5, the second power semiconductor switch group Sa2, the third power semiconductor switch group Sa3, the fourth power semiconductor switch group Sa4 and the second bus capacitor C12 during the second preset time T2. The first preset time T1 and the second preset time T2 may be the same or different.

Furthermore, the pulse width Width1 of the first pulse control signal S1, the pulse width Width2 of the second pulse control signal S2 and the pulse width Width2 of the third pulse control signal S3 partially overlap with an overlapping time, and the overlapping time is a first preset time T1; the pulse width Width2 of the second pulse control signal S2, the pulse width Width2 of the third pulse control signal S3, and the pulse width Width1 of the fourth pulse control signal S4 partially overlap with an overlapping time, and the overlapping is a second preset time T2. In this embodiment, the first power semiconductor switch group Sa1, the second power semiconductor switch group Sa2 and the third power semiconductor switch group Sa3 are subjected to phase dislocation modulation to discharge the first bus capacitor C11, wherein the second pulse control signal S2 is the same as the third pulse control signal S3, but their rising edges lag behind the rising edge of the first control signal S1. During the overlapping time (i.e., the first preset time T1) of the first control signal S1, the second pulse control signal S2 and the third pulse control signal S3, the first power semiconductor switch group Sa1, the second power semiconductor switch group Sa2 and the third power semiconductor switch group Sa3 are in an ON state, a discharge loop is formed among the first bus capacitor C11, the first power semiconductor switch group Sa1, the second power semiconductor switch group Sa2 and the third power semiconductor switch group Sa3, and the electric energy of the first bus capacitor C11 is consumed by the first power semiconductor switch group Sa1, the second power semiconductor switch group Sa2 and the third power semiconductor switch group Sa3. The second power semiconductor switch group Sa2, the third power semiconductor switch group Sa3 and the fourth power semiconductor switch group Sa4 are subjected to phase dislocation modulation to discharge the second bus capacitor C12, wherein the second pulse control signal S2 is the same as the third power semiconductor switch group Sa3, but their falling edges lag behind the rising edge of the fourth control signal S4. During the overlapping time (i.e., the second preset time) of the second pulse control signal S2, the third pulse control signal S3 and the fourth pulse control signal S4, the second power semiconductor switch group Sa2, the third power semiconductor switch group Sa3 and the fourth power semiconductor switch group Sa4 are all in an ON state, a discharge loop is formed among the second bus capacitor C12, the second power semiconductor switch group Sa2, the third power semiconductor switch group Sa3 and the fourth power semiconductor switch group Sa4, and the electric energy of the second bus capacitor C12 is consumed by the second power semiconductor switch group Sa2, the third power semiconductor switch group Sa3 and the fourth power semiconductor switch group Sa4. In this embodiment, the first bus capacitor C11 and the second bus capacitor C12 discharge equally in turn. Compared with the discharge control method shown in FIGS. 4 and 5, this discharge control method is advantageous in that it does not have the problem of the discharge control method shown in FIGS. 4 and 5, i.e., for the reasons such as the breakdown of the corresponding driver or the loss of a pulse control signal, some power semiconductor switch group is not turned on and causing accordingly invalid due to overvoltage.

It should be noted that, in other embodiments, the rising edges of the first pulse control signal S1, the second pulse control signal S2 and the third pulse control signal S3 are the same, while the falling edges of the second pulse control signal S2, the third pulse control signal S3 and the fourth pulse control signal S4 are the same; that is to say, the pulse width of the first pulse control signal S1 is the first preset time T1 and the pulse width of the fourth pulse control signal S4 is the second preset time T2, wherein the first preset time T1 and the second preset time T2 may be the same or different.

Figure 8:
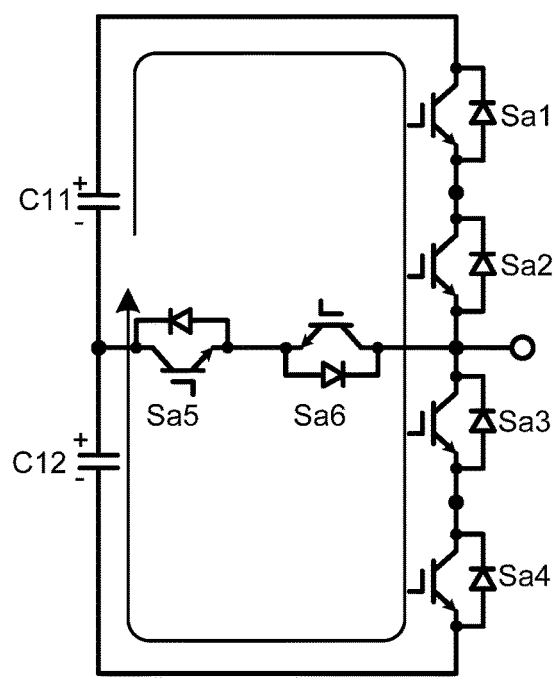
FIG. 8 is a discharge schematic diagram of a discharge loop of a bus capacitor in a T-type three-level power converter.
Figure 9:
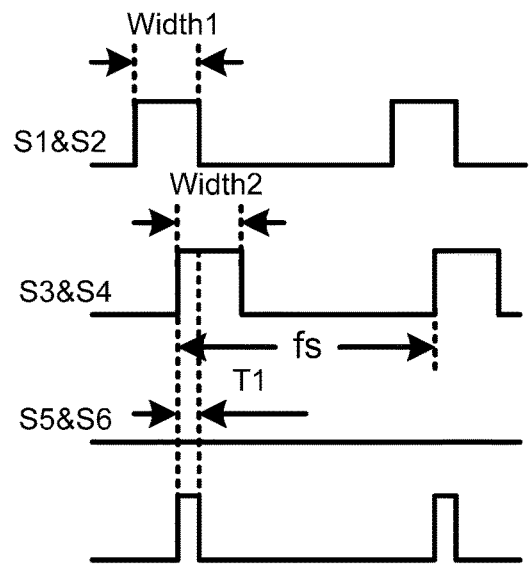
FIG. 9 is a waveform diagram of the pulse control signal in FIG. 8.

Please refer to FIGS. 8-9, of which FIG. 8 is a discharge schematic diagram of a discharge loop of a bus capacitor in a T-type three-level power converter, and FIG. 9 is a waveform diagram of the pulse control signal in FIG. 8. As shown in FIGS. 8-9, the T-type three-level power converter comprises a first bus capacitor C11, a second bus capacitor C12 and a single-phase bridge arm. The first bus capacitor C11 and the second bus capacitor C12 are connected in series. The single-phase bridge arm includes a first power semiconductor switch group Sa1, a second power semiconductor switch group Sa2, a third power semiconductor switch group Sa3, a fourth power semiconductor switch group Sa4, a fifth power semiconductor switch group Sa5 and a sixth power semiconductor switch group Sa6. The first power semiconductor switch group Sa1, the second power semiconductor switch group Sa2, the third power semiconductor switch group Sa3 and the fourth power semiconductor switch group Sa4 are connected in series and then connected in parallel to the positive terminal of the first bus capacitor C11 and the negative terminal of the second bus capacitor C12. The fifth power semiconductor switch group Sa5 and the sixth power semiconductor switch group Sa6 form a series branch, one end of the series branch is connected to the connection point of the first bus capacitor C11 and the second bus capacitor C12, and the other end of the series branch is connected to the connection point of the second power semiconductor switch group Sa2 and the third power semiconductor switch group Sa3. The first pulse control signal S1, the second pulse control signal S2, the third pulse control signal S3, and the fourth pulse control signal S4 control the ON and OFF of the first power semiconductor switch group Sa1, the second power semiconductor switch group Sa2, the third power semiconductor switch group Sa3, and the fourth power semiconductor switch group Sa4, respectively, so as to form the discharge loop among the first bus capacitor C11, the first power semiconductor switch group Sa1, the second power semiconductor switch group Sa2, the third power semiconductor switch group Sa3, the fourth power semiconductor switch group Sa4 and the second bus capacitor C12 during the preset time T1.

Furthermore, when the first power semiconductor switch group Sa1, the second power semiconductor switch group Sa2, the third power semiconductor switch group Sa3 and the fourth power semiconductor switch group Sa4 are subjected to phase dislocation modulation, the pulse width Width1 of the first pulse control signal S1, the pulse width Width1 of the second pulse control signal S2, the pulse width Width2 of the third pulse control signal S3, and the pulse width Width2 of the fourth pulse control signal S4 partially overlap with an overlapping time, and the overlapping time is a preset time T1, but the present disclosure is not limited thereto. In other embodiments, the pulse width of the first pulse control signal S1, the pulse width of the second pulse control signal S2, the pulse width of the third pulse control signal S3, and the pulse width of the fourth pulse control signal S4 may fully overlap. In this embodiment, the first power semiconductor switch group Sa1, the second power semiconductor switch group Sa2, the third power semiconductor switch group Sa3, and the fourth power semiconductor switch group Sa4 are all in an ON state for the preset time T1, and the electric energy of the first bus capacitor C11 and the second bus capacitor C12 is consumed by the first power semiconductor switch group Sa1, the second power semiconductor switch group Sa2, the third power semiconductor switch group Sa3 and the fourth power semiconductor switch group Sa4 to discharge the electric energy of the first bus capacitor C11 and the second bus capacitor C12.

It is worth noting that, in this embodiment, the pulse widths of the first pulse control signal S1 and the second pulse control signal S2 are the same, so are the pulse widths of the third pulse control signal S3 and the fourth pulse control signal S4.

Figure 10:
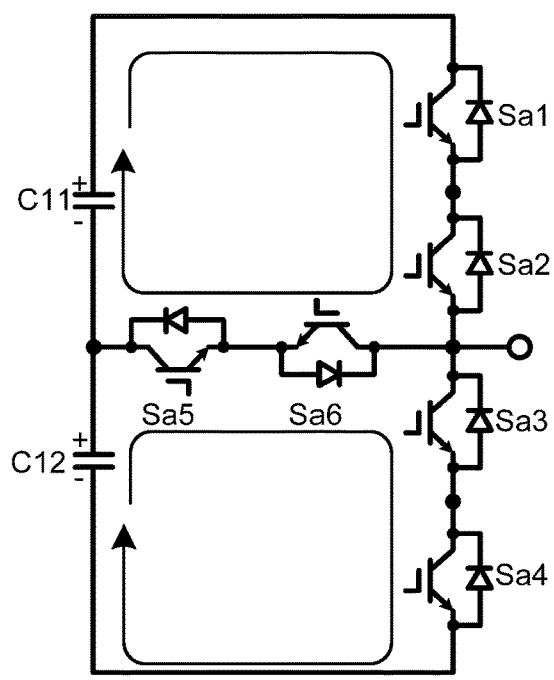
FIG. 10 is a discharge schematic diagram of a discharge loop of a bus capacitor in another T-type three-level power converter.
Figure 11:
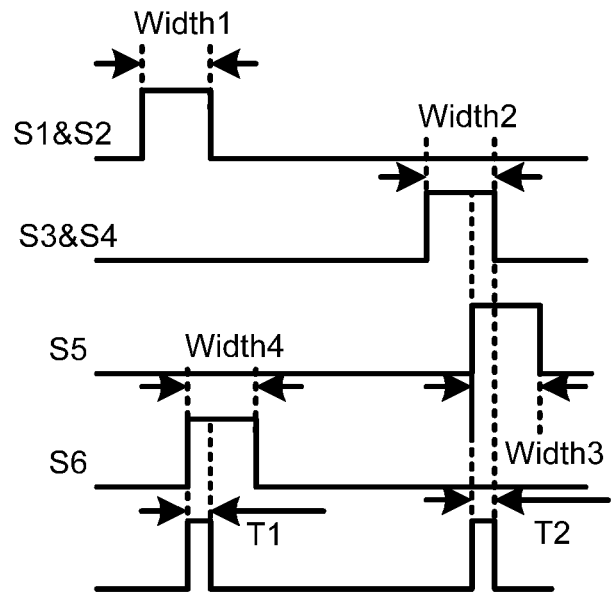
FIG. 11 is a waveform diagram of the pulse control signal in FIG. 10.

Please refer to FIGS. 10-11, of FIG. 10 is a discharge schematic diagram of a discharge loop of a bus capacitor in another T-type three-level power converter, and FIG. 11 is a waveform diagram of the pulse control signal in FIG. 10. The structure of the T-type three-level power converter shown in FIGS. 10-11 is exactly the same as that shown in FIGS. 8-9, so details will not be repeated here, and the difference will be described below. The first pulse control signal S1, the second pulse control signal S2, the third pulse control signal S3, the fourth pulse control signal S4, the fifth pulse control signal S5, and the sixth pulse control signal S6 control the ON and OFF of the first power semiconductor switch group Sa1, the second power semiconductor switch group Sa2, the third power semiconductor switch group Sa3, the fourth power semiconductor switch group Sa4, the fifth power semiconductor switch group Sa5 and the sixth power semiconductor switch group Sa6, respectively, so as to form a discharge loop among the first bus capacitor C11, the first power semiconductor switch group Sa1, the second power semiconductor switch group Sa2, the fifth power semiconductor switch group Sa5 and the sixth power semiconductor switch group Sa6 during the first preset time T1, and to form a discharge loop among the second bus capacitor C12, the fifth power semiconductor switch group Sa5, the sixth power semiconductor switch group Sa6, the third power semiconductor switch group Sa3 and the fourth power semiconductor switch group Sa4 during the second preset time T2. The first preset time T1 and the second preset time T2 may be the same or different.

Furthermore, when the first power semiconductor switch group Sa1, the second power semiconductor switch group Sa2, the third power semiconductor switch group Sa3, the fourth power semiconductor switch group Sa4, the fifth power semiconductor switch group Sa5 and the sixth power semiconductor switch group Sa6 are subjected to phase dislocation modulation, the pulse width Width1 of the first pulse control signal S1, the pulse width Width1 of the second pulse control signal S2 and the pulse width Width4 of the sixth pulse control signal S6 partially overlap with an overlapping time, and the overlapping time is a first preset time T1; the pulse width Width2 of the third pulse control signal S3, the pulse width Width2 of the fourth pulse control signal S4 and the pulse width Width3 of the fifth pulse control signal S5 partially overlap with an overlapping time, and the overlapping time is a second preset time T2. But, the present disclosure is not limited thereto. In other embodiments, the pulse width of the first pulse control signal S1, the pulse width of the second pulse control signal S2 and the pulse width of the sixth pulse control signal S6 can fully overlap, and the pulse width of the third pulse control signal S3, the pulse width of the fourth pulse control signal S4 and the pulse width of the fifth pulse control signal S5 can fully overlap. In this embodiment, the first power semiconductor switch group Sa1, the second power semiconductor switch group Sa2, the fifth power semiconductor switch group Sa5 and the sixth power semiconductor switch group Sa6 are all in an ON state for the first preset time T1, and the electric energy of the bus capacitor C11 is discharged through the first power semiconductor switch group Sa1, the second power semiconductor switch group Sa2, the fifth power semiconductor switch group Sa5 and the sixth power semiconductor switch group Sa6; the third power semiconductor switch group Sa3, the fourth power semiconductor switch group Sa4, the fifth power semiconductor switch group Sa5 and the sixth power semiconductor switch group Sa6 are all in an ON state for the second preset time T2, and the electric energy of the bus capacitor C12 is discharged through the third power semiconductor switch group Sa3, the fourth power semiconductor switch group Sa4, the fifth power semiconductor switch group Sa5 and the sixth power semiconductor switch group Sa6.

It is worth noting that, in this embodiment, the first pulse control signal S1 and the second pulse control signal S2 are the same, so are the third pulse control signal S3 and the fourth pulse control signal S4.

In other embodiments, the discharge control methods for the first bus capacitor C11 and the second bus capacitor C12 can also be subdivided into a discharge control method in a high-voltage state and a discharge control method in a low-voltage state, in order to make full use of the discharge capacity of the power semiconductor switch groups and increase the discharge rate. A bus voltage detection circuit is used for detecting bus voltage real time and transferring bus voltage to a controller; after the controller determines the bus voltage is high or low, the corresponding discharge control method is carried out. In this embodiment, when the bus voltage is high, e.g., between 1 kV and 10 kV, the controller executes a discharge control method in a high-voltage state, generating the corresponding first pulse control Signal S1, second pulse control signal S2, third pulse control signal S3 and fourth pulse control signal S4, which partially overlap, by means of phase dislocation modulation. The overlapping time is a first preset time, e.g., 100 ns, which is shorter. When the bus voltage is low, e.g., less than 1 kv, the controller executes a discharge control method in a low-voltage state, generating the corresponding first pulse control Signal S1, second pulse control signal S2, third pulse control signal S3 and fourth pulse control signal S4, which partially overlap, by means of phase dislocation modulation. The overlapping time is a second preset time, e.g., 270 ns, which is longer; wherein the overlapping time of the pulse control signals in the low-voltage state is greater than that in the high-voltage state, that is, the first preset time is shorter than the second preset time, and the discharge rate of the bus capacitors in the low-voltage state is lower than the discharge rate of the bus capacitors in the high-voltage state; when the bus voltage is lower than 30V, the controller stops generating the first pulse control signal S1, the second pulse control signal S2, the third pulse control signal S3 and the fourth pulse control signal S4, and then the discharge of the first bus capacitor C11 and the second bus capacitor C12 is stopped.

Figure 12:
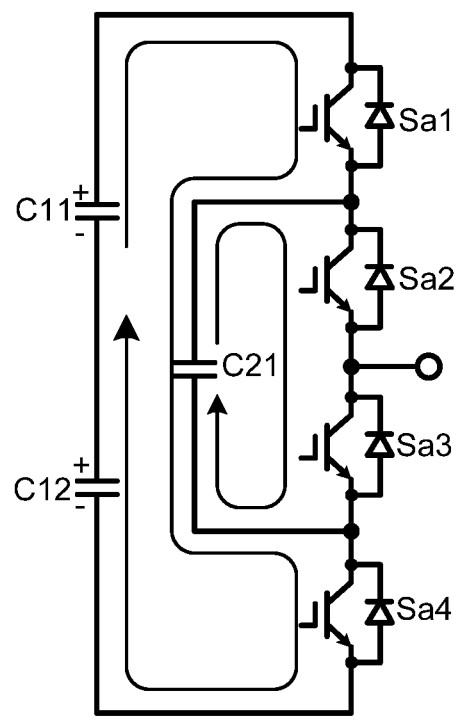
FIG. 12 is a discharge schematic diagram of a discharge loop of a bus capacitor in a three-level power converter comprising a flying capacitor.
Figure 13:
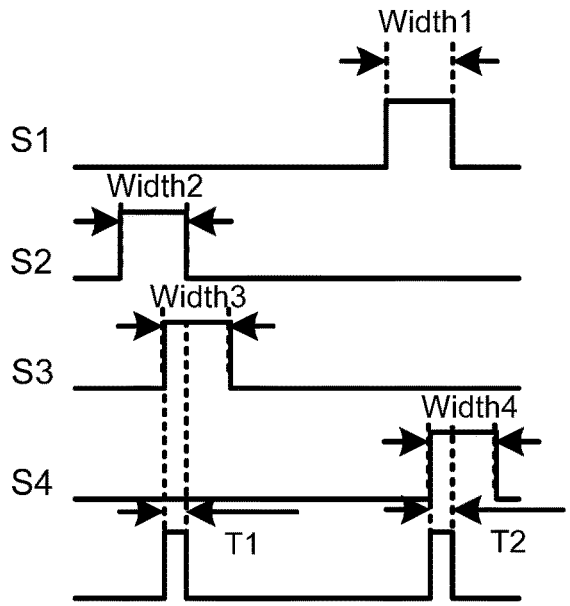
FIG. 13 is a waveform diagram of the pulse control signal in FIG. 12.

Please refer to FIGS. 12-13, of which FIG. 12 is a discharge schematic diagram of a discharge loop of a bus capacitor in a three-level power converter comprising a flying capacitor, and FIG. 13 is a waveform diagram of the pulse control signal in FIG. 12. As shown in FIGS. 12-13, the three-level power converter comprising a flying capacitor includes a first bus capacitor C11, a second bus capacitor C12, a first capacitor group C21 and a single-phase bridge arm. The first bus capacitor C11 and the second bus capacitor C12 are connected in series. The single-phase bridge arm includes a first power semiconductor switch group Sa1, a second power semiconductor switch group Sa2, a third power semiconductor switch group Sa3 and a fourth power semiconductor switch group Sa4. The first power semiconductor switch group Sa1, the second power semiconductor switch group Sa2, the third power semiconductor switch group Sa3 and the fourth power semiconductor switch group Sa4 are connected in series and then are connected in parallel to the positive terminal of the first bus capacitor C11 and the negative terminal of the second bus capacitor C12. One end of the first capacitor group C21 is connected to the connection point of the first power semiconductor switch group Sa1 and the second power semiconductor switch group Sa2, and the other end of the first capacitor group C21 is connected to the connection point of the third power semiconductor switch group Sa3 and the fourth power semiconductor switch Group Sa4. The first pulse control signal S1, the second pulse control signal S2, the third pulse control signal S3, and the fourth pulse control signal S4 control the ON and OFF of the first power semiconductor switch group Sa1, the second power semiconductor switch group Sa2, the third power semiconductor switch Group Sa3 and the fourth power semiconductor switch group Sa4, respectively, so as to form a discharge loop among the first capacitor group C21, the second power semiconductor switch group Sa2 and the third power semiconductor switch group Sa3 during the first preset time T1, and to form a discharge loop among the first bus capacitor C11, the first power semiconductor switch group Sa1, the first capacitor group C21, the fourth power semiconductor switch group Sa4 and the second bus capacitor C12 during the second preset time T2.

Furthermore, the pulse width Width2 of the second pulse control signal S2 and the pulse width Width3 of the third pulse control signal S3 partially overlap with an overlapping time, and the overlapping time is the first preset time T1; the pulse width Width1 of the first pulse control signal S1 and the pulse width Width4 of the fourth pulse control signal S4 partially overlap with an overlapping time, and the overlapping time is the second preset time T2. But, the present disclosure is not limited thereto. In other embodiments, the pulse width of the second pulse control signal S2 and the pulse width of the third pulse control signal S3 fully overlap; the pulse width of the first pulse control signal S1 and the pulse width of the fourth pulse control signal S4 fully overlap. In this embodiment, the second power semiconductor switch group Sa2 and the third power semiconductor switch group Sa3 are subjected to phase dislocation modulation, the first power semiconductor switch group Sa1 and the fourth power semiconductor switch group Sa4 keep being off, and the electric energy of the first capacitor group C21 is discharged through the second power semiconductor switch group Sa2 and the third power semiconductor switch group Sa3; then, the first power semiconductor switch group Sa1 and the fourth power semiconductor switch group Sa4 are subjected to phase dislocation modulation, the second power semiconductor switch group Sa2 and the third power semiconductor switch group Sa3 keep being off, i.e., the electric energy of the first bus capacitor C11 and the second bus capacitor C12 is charged to the first capacitor group C21 through the first power semiconductor switch group Sa1 and the fourth power semiconductor switch group Sa4, and the above phase dislocation modulation of the first power semiconductor switch group Sa1, the second power semiconductor switch group Sa2, the third power semiconductor switch group Sa3 and the fourth power semiconductor switch group Sa4 is repeated to finally discharge the electric energy of the first bus capacitor C11 and the second bus capacitor C12. In the course of discharging the first bus capacitor C11, when the difference among the first bus capacitor C11, the second bus capacitor C12 and the first capacitor group C21 exceeds a set value, the second power semiconductor switch group Sa2 and the third power semiconductor switch group Sa3 are turned off to maintain the equalized discharge of the first bus capacitor C11, the second bus capacitor C12 and the first capacitor group C21. In the course of charging the first capacitor group C21, if the voltage of the first capacitor group C21 exceeds a set value, the first power semiconductor switch group Sa1 and the fourth power semiconductor switch group Sa4 are turned off to ensure that the first capacitor group C21 does not risk overvoltage.

Figure 14:
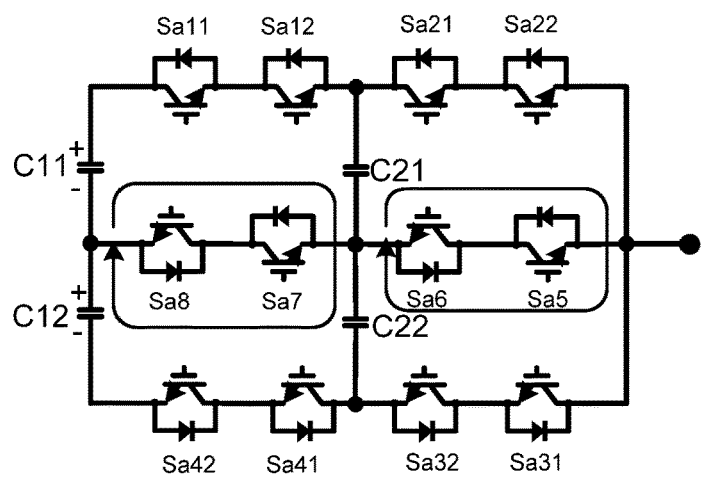
FIG. 14 is a discharge schematic diagram of a discharge loop of a bus capacitor in a power converter consisting of 5L-NPP topology.

Please refer to FIG. 14, which is a discharge schematic diagram of a discharge loop of a bus capacitor in a power converter consisting of 5L-NPP topology. The 5L-NPP power converter comprises a first bus capacitor C11 and a second bus capacitor C12. The first capacitor group includes a first capacitor C21 and a second capacitor C22. The first power semiconductor switch group includes two first power semiconductor switches Sa11 and Sa12 connected in series, the second power semiconductor switch group includes two second power semiconductor switches Sa21 and Sa22 connected in series, the third power semiconductor switch group includes two third power semiconductor switches Sa31 and Sa32 connected in series, the fourth power semiconductor switch group includes two fourth power semiconductor switches Sa41 and Sa42 connected in series, wherein the connection relation of the first bus capacitor C11, the second bus capacitor C12, the first capacitor group, the first power semiconductor switch group, the second power semiconductor switch group, the third power semiconductor switch group and the fourth power semiconductor switch group is the same as that shown in FIG. 12, and the discharge control method for the first bus capacitor C11 and the second bus capacitor C12 is the same as that shown in FIG. 13, so details will not be repeated here, and the difference will be described below. Two series-connected power semiconductor switches Sa1 and Sa8 are connected between the connection point of the first bus capacitor C11 and the second bus capacitor C12 and the connection point of the first capacitor C21 and the second capacitor C22; two series-connected power semiconductor switches Sa5 and Sa6 are connected between the connection point of the first capacitor C21 and the second capacitor C22 and the connection point of the second power semiconductor switch Sa22 and the third power semiconductor switch Sa31.

Figure 16:
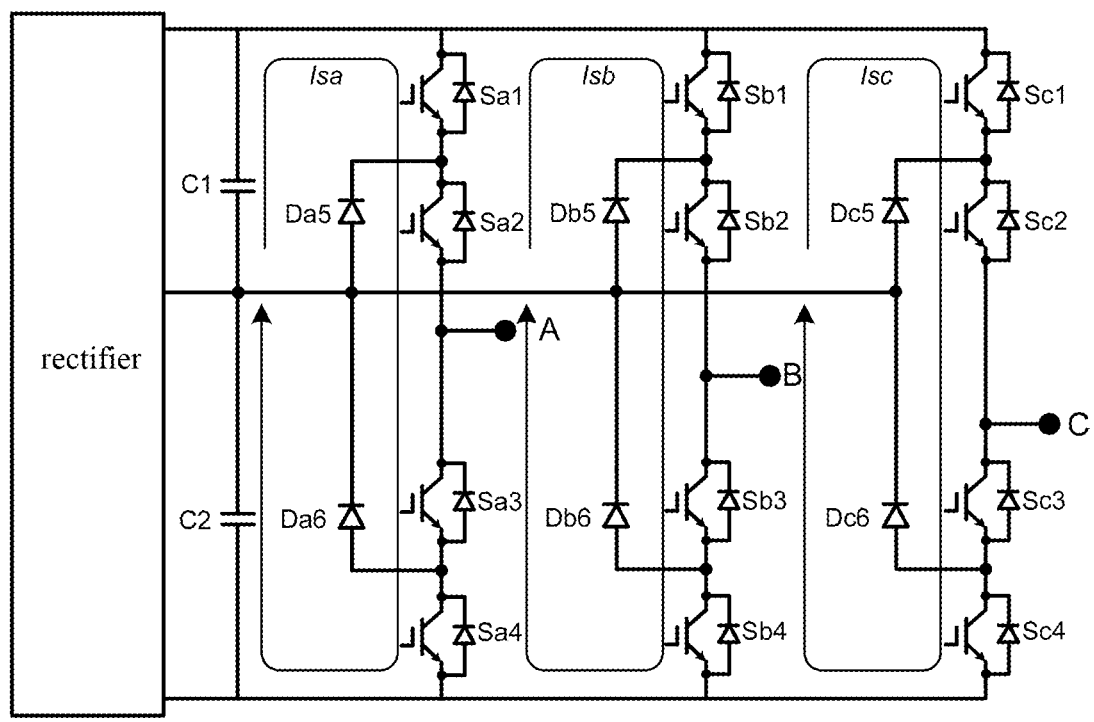
FIG. 16 is a discharge schematic diagram of a bus capacitor in a three-phase converter.

Please refer to FIGS. 15-16, of which FIG. 15 is a flow chart of a discharge control method for a bus capacitor in a power converter according to another example of the present disclosure, and FIG. 16 is a schematic diagram of discharge loop for a bus capacitor in a three-phase converter.

The discharge control method for a bus capacitor in a power converter as shown in FIG. 15 comprises the following steps:

step 21: judging the working state of the power converter and the state of the main circuit breaker of the power converter by a controller, and outputting a plurality of pulse control signals to the corresponding plurality of power semiconductor switch groups when the working state of the power converter is in a discharge state and the state of the main circuit breaker is open; and step 22: controlling the ON and OFF of the plurality of power semiconductor switch groups respectively by the plurality of pulse control signals, so as to form a discharge loop between the positive terminal and the negative terminal of the bus capacitor within at least a preset time, thereby causing the bus capacitor to discharge, wherein, during one duty cycle, the pulse width of the pulse control signal for controlling the power semiconductor switch group of the first bridge arm has a first overlapping time; the pulse width of the pulse control signal for controlling the power semiconductor switch group of the second bridge arm has a second overlapping time; the pulse width of the pulse control signal for controlling the power semiconductor switch group of the third bridge arm has a third overlapping time; a phase difference among the first overlapping time, the second overlapping time and the third overlapping time is 120°, and during the first overlapping time, the power semiconductor switch group of the first bridge arm is in an On state, and the bus capacitor and the power semiconductor switch group of the first bridge arm form a discharge loop;

during the second overlapping time, the power semiconductor switch group of the second bridge arm is in an On state, and the bus capacitor and the power semiconductor switch group of the second bridge arm form a discharge loop; and during the third overlapping time, the power semiconductor switch group of the third bridge arm is in an On state, and the bus capacitor and the power semiconductor switch group of the third bridge arm form a discharge loop.

As shown in FIG. 16, the three-phase converter comprises a first bus capacitor C1, a second bus capacitor C2 and three single-phase bridge arms A, B, and C. The first bus capacitor C1 and the second bus capacitor C2 are connected in series. One end of the three single-phase bridge arms A, B and C connected in parallel is connected to the positive terminal of the first bus capacitor C1, and the other end of the three single-phase bridge arms A, B and C connected in parallel is connected to the negative terminal of the second bus capacitor C2. The bridge arm A includes power semiconductor switch groups Sa1, Sa2, Sa3 and Sa4, the bridge arm B includes power semiconductor switch groups Sb1, Sb2, Sb3 and Sb4, and the bridge arm C includes power semiconductor switch groups Sc1, Sc2, Sc3 and Sc4, wherein the pulse control signals for controlling the power semiconductor switch groups Sa1, Sa2, Sa3 and Sa4 have a first overlapping time, the pulse control signals for controlling the power semiconductor switch groups Sb1, Sb2, Sb3 and Sb4 have a second overlapping time, and the pulse control signals for controlling the power semiconductor switch groups Sc1, Sc2, Sc3, and Sc4 have a third overlapping time, with a phase difference of 120° among the first overlapping time, the second overlapping time and the third overlapping time. During the first overlapping time, the first bus capacitor C1, the second bus capacitor C2 and the power semiconductor switch groups Sa1, Sa2, Sa3, and Sa4 of the bridge arm A form a discharge loop to discharge the electric energy of the first bus capacitor C1 and the second bus capacitor C2 through the power semiconductor switch groups Sa1, Sa2, Sa3, and Sa4 of the bridge arm A; during the second overlapping time, the first bus capacitor C1, the second bus capacitor C2 and the power semiconductor switch groups Sb1, Sb2, Sb3 and Sb4 of the bridge arm B form a discharge loop to discharge the electric energy of the first bus capacitor C1 and the second bus capacitor C2 through the power semiconductor switch groups Sb1, Sb2, Sb3 and Sb4 of the bridge arm B; during the third overlapping time, the first bus capacitor C1, the second bus capacitor C2 and the power semiconductor switch groups Sc1, Sc2, Sc3 and Sc4 of the bridge arm C form a discharge loop to discharge the electric energy of the first bus capacitor C1 and the second bus capacitor C2 through the power semiconductor switch groups Sc1, Sc2, Sc3 and Sc4 of the bridge arm C. The electric energy of the first bus capacitor C1 and the second bus capacitor C2 is discharged by the power semiconductor switch groups of the three bridge arms in turn. When the driver for some power semiconductor switch group breaks down, the controller will stop sending pulse control signals to the driver, so that the bridge arm where the power semiconductor switch group driven by the driver locates does not participate in the discharge of the first bus capacitor C1 and the second bus capacitor C2, thereby making the discharge more flexible. In this embodiment, the discharge mode of every single-phase bridge arm in the three-phase bridge arms is described as above, and will not be repeated here.

In the present disclosure, bus capacitors are discharged using the loss of power semiconductor switch groups, thereby saving high voltage relays and discharge resistors in the conventional discharge control methods, and reducing the system cost and complexity; in the above-mentioned discharge control method, the pulse control signals of the fixed pulse widths are used and the discharge current is controlled by overlapping the pulse control signals for controlling the power semiconductor switches of the same bridge arm (i.e., effective on-narrow pulses), in this regard, the above-mentioned discharge control method can control the discharge current precisely and is not limited by the minimum pulse width of the drivers for the power semiconductor switches; the above-mentioned discharge control method is adapted for discharging bus capacitors in all kinds of converters, including, but not limited to, voltage source type two-level topology, diode-clamped three-level topology (NPC), flying capacitor three-level topology (FCC) and NPP topology.

It is to be noted that the above embodiments are only used to illustrate the present disclosure but not to limit the technical solution described in the present disclosure; moreover, although the present disclosure is described in detail with reference to the above embodiments in this specification, the ordinary persons skilled in the art should understand that changes or equivalent substitutions can still be made to the present disclosure; thus, all the technical solutions not departing from the spirit and scope of the present disclosure and the improvements thereof should be covered by the protection scope of the appended claims of the present disclosure.

What is claimed is:

1. A discharge control method for a bus capacitor in a power converter including a bridge arm and the bus capacitor connected in parallel, wherein the bridge arm includes a first power semiconductor switch group, a second power semiconductor switch group, a third power semiconductor switch group and a fourth power semiconductor switch group, and the bus capacitor includes a first bus capacitor and a second bus capacitor which are connected in series, the first power semiconductor switch group, the second power semiconductor switch group, the third power semiconductor switch and the fourth power semiconductor switch group are connected in series and then are connected in parallel to a positive terminal of the first bus capacitor and a negative terminal of the second bus capacitor; the power converter further comprises a fifth switch group and a sixth switch group, one end of the fifth switch group being connected to a connection point of the first bus capacitor and the second bus capacitor, the other end of the fifth switch group being connected to a connection point of the first power semiconductor switch group and the second power semiconductor switch group, one end of the sixth switch group being connected to the connection point of the first bus capacitor and the second bus capacitor, and the other end of the sixth switch group being connected to a connection point of the third power semiconductor switch group and the fourth power semiconductor switch group; and wherein the method comprises:

judging a working state of the power converter and a connection state of the power converter to outside by a controller, and outputting a plurality of pulse control signals to the corresponding plurality of power semiconductor switch groups when the working state of the power converter is in a discharge state and the power converter is disconnected from outside; and controlling ON and OFF of the plurality of power semiconductor switch groups respectively by the plurality of pulse control signals, such that the bus capacitor and the semiconductor switch groups in an ON state form a discharge loop between the positive terminal and the negative terminal of the bus capacitor within at least one preset time, thereby causing the bus capacitor to discharge and causing the electric energy of the bus capacitor to be consumed in the power semiconductor switch groups in an ON state, wherein the at least one preset time includes a first preset time and a second preset time, the plurality of pulse control signals include a first pulse control signal, a second pulse control signal, a third pulse control signal and a fourth pulse control signal for controlling the ON and OFF of the first power semiconductor switch group, the second power semiconductor switch group, the third power semiconductor switch group and the fourth power semiconductor switch group, respectively, so as to form the discharge loop among the first bus capacitor, the first power semiconductor switch group, the second power semiconductor switch group, the third power semiconductor switch group and the sixth switch group during the first preset time, and to form the discharge loop among the fifth switch group, the second power semiconductor switch group, the third power semiconductor switch group, the fourth power semiconductor switch group and the second bus capacitor during the second preset time.

2. The discharge control method for the bus capacitor in the power converter according to claim 1, characterized in that a pulse width of the first pulse control signal, a pulse width of the second pulse control signal, a pulse width of the third pulse control signal and a pulse width of the fourth pulse control signal fully or partially overlap.

3. The discharge control method for the bus capacitor in the power converter according to claim 1, characterized in that the first preset time and the second preset time are the same or different.

4. The discharge control method for the bus capacitor in the power converter according to claim 1, characterized in that a pulse width of the first pulse control signal, a pulse width of the second pulse control signal and a pulse width of the third pulse control signal partially overlap with a first overlapping time, and the first overlapping time is the first preset time; and the pulse width of the second pulse control signal, the pulse width of the third pulse control signal and a pulse width of the fourth pulse control signal partially overlap with a second overlapping time, and the second overlapping time is the second preset time.

5. The discharge control method for the bus capacitor in the power converter according to claim 4, characterized in that the second pulse control signal and the third pulse control signal are the same.

6. A discharge control method for a bus capacitor in a power converter including a bridge arm and the bus capacitor connected in parallel, wherein the bridge arm includes a first power semiconductor switch group, a second power semiconductor switch group, a third power semiconductor switch group and a fourth power semiconductor switch group, the bus capacitor includes a first bus capacitor and a second bus capacitor which are connected in series, and the first power semiconductor switch group, the second power semiconductor switch group, the third power semiconductor switch and the fourth power semiconductor switch group are connected in series and then are connected in parallel to a positive terminal of the first bus capacitor and a negative terminal of the second bus capacitor;

the power converter further comprises a fifth power semiconductor switch group and a sixth power semiconductor switch group, the fifth power semiconductor switch group and the sixth power semiconductor switch group forming a series branch, one end of the series branch being connected to a connection point of the first bus capacitor and the second bus capacitor, and the other end of the series branch being connected to a connection point of the second power semiconductor switch group and the third power semiconductor switch group; and wherein the method comprises:

judging a working state of the power converter and a connection state of the power converter to outside by a controller, and outputting a plurality of pulse control signals to the corresponding plurality of power semiconductor switch groups when the working state of the power converter is in a discharge state and the power converter is disconnected from outside; and controlling ON and OFF of the plurality of power semiconductor switch groups respectively by the plurality of pulse control signals, such that the bus capacitor and the power semiconductor switch groups in an ON state form a discharge loop between the positive terminal and the negative terminal of the bus capacitor within at least one preset time, thereby causing the bus capacitor to discharge and causing the electric energy of the bus capacitor to be consumed in the power semiconductor switch groups in an ON state, wherein the at least one preset time includes a first preset time and a second preset time; the plurality of pulse control signals include a first pulse control signal, a second pulse control signal, a third pulse control signal, a fourth pulse control signal, a fifth pulse control signal and a sixth pulse control signal for controlling the ON and OFF of the first power semiconductor switch group, the second power semiconductor switch group, the third power semiconductor switch group, the fourth power semiconductor switch group, the fifth power semiconductor switch group and the sixth power semiconductor switch group, respectively, so as to form the discharge loop among the first bus capacitor, the first power semiconductor switch group, the second power semiconductor switch group, the fifth power semiconductor switch group and the sixth power semiconductor switch group during the first preset time, and to form the discharge loop among the second bus capacitor, the fifth power semiconductor switch group, the sixth power semiconductor switch group, the third power semiconductor switch group and the fourth power semiconductor switch group during the second preset time.

7. The discharge control method for the bus capacitor in the power converter according to claim 6, characterized in that a pulse width of the first pulse control signal, a pulse width of the second pulse control signal, a pulse width of the third pulse control signal and a pulse width of the fourth pulse control signal fully or partially overlap.

8. The discharge control method for the bus capacitor in the power converter according to claim 6, characterized in that the first preset time and the second preset time are the same or different.

9. The discharge control method for the bus capacitor in the power converter according to claim 6, characterized in that a pulse width of the first pulse control signal, a pulse width of the second pulse control signal and a pulse width of the sixth pulse control signal fully or partially overlap with a first overlapping time, and the first overlapping time is the first preset time; and a pulse width of the third pulse control signal, a pulse width of the fourth pulse control signal and a pulse width of the fifth pulse control signal fully or partially overlap with a second overlapping time, and the second overlapping time is the second preset time.

10. The discharge control method for the bus capacitor in the power converter according to claim 9, characterized in that the first pulse control signal and the second pulse control signal are the same, and the third pulse control signal and the fourth pulse control signal are the same.

11. A discharge control method for a bus capacitor in a power converter, wherein the bridge arm includes a first power semiconductor switch group, a second power semiconductor switch group, a third power semiconductor switch group and a fourth power semiconductor switch group, the bus capacitor includes a first bus capacitor and a second bus capacitor which are connected in series, and the first power semiconductor switch group, the second power semiconductor switch group, the third power semiconductor switch and the fourth power semiconductor switch group are connected in series and then are connected in parallel to a positive terminal of the first bus capacitor and a negative terminal of the second bus capacitor; the power converter further comprises a first capacitor group, one end of the first capacitor group being connected to a connection point of the first power semiconductor switch group and the second power semiconductor switch group, and the other end of the first capacitor group being connected to a connection point of the third power semiconductor switch group and the fourth power semiconductor switch group; wherein the method comprises:

judging a working state of the power converter and a connection state of a main circuit breaker in the power converter to outside by a controller, and outputting a plurality of pulse control signals to the corresponding plurality of power semiconductor switch groups when the working state of the power converter is in a discharge state and the power converter is disconnected from outside; and controlling ON and OFF of the plurality of power semiconductor switch groups respectively by the plurality of pulse control signals, such that the bus capacitor and the power semiconductor switch groups in an ON state form a discharge loop between the positive terminal and the negative terminal of the bus capacitor within at least one preset time, thereby causing the bus capacitor to discharge and causing the electric energy of the bus capacitor to be consumed in the power semiconductor switch groups in an ON state, wherein the at least one preset time includes a first preset time and a second preset time; the plurality of pulse control signals include a first pulse control signal, a second pulse control signal, a third pulse control signal and a fourth pulse control signal for controlling the ON and OFF of the first power semiconductor switch group, the second power semiconductor switch group, the third power semiconductor switch group and the fourth power semiconductor switch group, respectively, so as to form the discharge loop among the first capacitor group, the second power semiconductor switch group and the third power semiconductor switch group during the first preset time, and to form the discharge loop among the first bus capacitor, the first power semiconductor switch group, the first capacitor group, the fourth power semiconductor switch group and the second bus capacitor during the second preset time.

12. The discharge control method for the bus capacitor in the power converter according to claim 11, characterized in that a pulse width of the second pulse control signal and a pulse width of the third pulse control signal fully or partially overlap with a first overlapping time, and the first overlapping time is the first preset time; and a pulse width of the first pulse control signal and a pulse width of the fourth pulse control signal fully or partially with a second overlapping time, and the second overlapping time is the second preset time.

13. The discharge control method for the bus capacitor in the power converter according to claim 11, characterized in that the first capacitor group includes a first capacitor and a second capacitor connected in series, the first power semiconductor switch group includes two first power semiconductor switches connected in series, the second power semiconductor switch group includes two second power semiconductor switches connected in series, the third power semiconductor switch group includes two third power semiconductor switches mutually connected in series, the fourth power semiconductor switch group includes two fourth power semiconductor switches connected in series, and a fifth power semiconductor switch group and a sixth power semiconductor switch group are further comprised, wherein the fifth power semiconductor switch group includes two fifth power semiconductor switches connected in series, and the sixth power semiconductor switch group includes two sixth power semiconductor switches connected in series, the fifth power semiconductor switch group being connected between the connection point of the first bus capacitor and the second bus capacitor and the connection point of the first capacitor and the second capacitor, and the sixth power semiconductor switch group being connected between the connection point of the first capacitor and the second capacitor and the connection point of the second power semiconductor switch group and the third power semiconductor switch group.

* * * * *